US009648075B1

(12) United States Patent
Kalinke

(10) Patent No.: US 9,648,075 B1
(45) Date of Patent: May 9, 2017

(54) SYSTEMS AND METHODS FOR PROVIDING AN EVENT MAP

(71) Applicant: Google Inc., Mountain View, CA (US)

(72) Inventor: Frederic Kalinke, Dublin (IE)

(73) Assignee: GOOGLE INC., Mountain View, CA (US)

( * ) Notice: Subject to any disclaimer, the term of this patent is extended or adjusted under 35 U.S.C. 154(b) by 439 days.

(21) Appl. No.: 13/719,014

(22) Filed: Dec. 18, 2012

(51) Int. Cl.
*G06F 15/16* (2006.01)
*H04L 29/08* (2006.01)

(52) U.S. Cl.
CPC .................................. *H04L 67/02* (2013.01)

(58) Field of Classification Search
CPC H04L 29/08072; H04L 29/06; H04L 29/0809
USPC .......................................................... 709/217
See application file for complete search history.

(56) References Cited

U.S. PATENT DOCUMENTS

| 6,970,183 | B1* | 11/2005 | Monroe | 348/143 |
| 8,125,334 | B1* | 2/2012 | Loyal et al. | 340/540 |
| 8,989,778 | B2* | 3/2015 | Altman et al. | 455/456.3 |
| 2003/0023595 | A1* | 1/2003 | Carlbom et al. | 707/7 |
| 2003/0085992 | A1* | 5/2003 | Arpa et al. | 348/47 |
| 2004/0204820 | A1 | 10/2004 | Diaz | |
| 2005/0050575 | A1* | 3/2005 | Arseneau | 725/100 |
| 2007/0218900 | A1* | 9/2007 | Abhyanker | 455/435.1 |
| 2007/0281689 | A1* | 12/2007 | Altman et al. | 455/435.1 |
| 2008/0052372 | A1* | 2/2008 | Weber et al. | 709/217 |
| 2008/0065321 | A1* | 3/2008 | Dacosta | 701/208 |
| 2008/0242317 | A1* | 10/2008 | Abhyanker | 455/456.3 |
| 2009/0019085 | A1* | 1/2009 | Abhyanker | 707/104.1 |
| 2009/0112467 | A1* | 4/2009 | Jiang et al. | 701/211 |
| 2009/0132511 | A1* | 5/2009 | Yang et al. | 707/5 |
| 2009/0132643 | A1* | 5/2009 | Reed et al. | 709/203 |
| 2009/0132645 | A1* | 5/2009 | Yang et al. | 709/203 |
| 2009/0132646 | A1* | 5/2009 | Yang et al. | 709/203 |
| 2009/0299999 | A1* | 12/2009 | Loui et al. | 707/5 |
| 2010/0088336 | A1 | 4/2010 | Johnston et al. | |
| 2010/0169130 | A1* | 7/2010 | Fineman et al. | 705/5 |
| 2010/0317370 | A1 | 12/2010 | Feng et al. | |

(Continued)

FOREIGN PATENT DOCUMENTS

AU 2009100548 A4 9/2009
WO 2010083525 A1 7/2010

OTHER PUBLICATIONS

Pospischil, Gunther et al., "Designing LoL@, a Mobile Tourist Guide for UMTS," 2002, pp. 140-154, Springer-Verlag Berlin Heidelberg.

*Primary Examiner* — Kristie Shingles
*Assistant Examiner* — Timothy Sowa
(74) *Attorney, Agent, or Firm* — Marshall, Gerstein & Borun LLP

(57) ABSTRACT

Provided are systems and methods for generating an event map of events located near a user's location. The event map may include embedded media, such as audio, video, images, and the like for events located within a specific geographic area, such as geographic radius around a user's location, and a specific timeframe. Each event may be displayed at a position on the event map that corresponds to the location of the event, and the embedded media for the event may be displayed at an event's position. Additionally, the event map may include data for each event, such as date and time of the event and links to event-related resources.

19 Claims, 8 Drawing Sheets

(56) References Cited

U.S. PATENT DOCUMENTS

| | | | |
|---|---|---|---|
| 2011/0035150 A1* | 2/2011 | Sundarraj | G08G 1/166 |
| | | | 701/301 |
| 2011/0183732 A1* | 7/2011 | Block et al. | 463/1 |
| 2011/0188760 A1* | 8/2011 | Wright et al. | 382/203 |
| 2011/0264370 A1* | 10/2011 | Jakobson et al. | 701/209 |
| 2011/0289065 A1 | 11/2011 | Wells | |
| 2012/0136865 A1* | 5/2012 | Blom et al. | 707/739 |
| 2012/0206464 A1* | 8/2012 | Kim et al. | 345/520 |
| 2012/0284333 A1* | 11/2012 | Neff | 709/204 |
| 2013/0080922 A1* | 3/2013 | Elias et al. | 715/753 |
| 2014/0143004 A1* | 5/2014 | Abhyanker | 705/7.19 |
| 2014/0200963 A1* | 7/2014 | Abhyanker | 705/7.34 |
| 2014/0236644 A1* | 8/2014 | Abhyanker | 705/5 |
| 2015/0005010 A1* | 1/2015 | Zhang et al. | 455/456.3 |

\* cited by examiner

SYSTEMS AND METHODS FOR PROVIDING AN EVENT MAP

BACKGROUND OF THE INVENTION

1. Field of the Invention

This invention relates generally to computer-implemented searches and, more particularly, to searches for events of interest to a user.

2. Description of the Related Art

The Internet is useful for a variety of purposes. For example, users may use the Internet to search geographic areas, such as to retrieve information about businesses located in a geographic area, events occurring in the geographic area, etc. Although information about such events may be generally available in some form, the information, and the presentation of the information, may be unstructured and may not present the information in an easily viewable format to the user. For example, a user searching for events located in a geographic area may not be able to easily ascertain the location of each event and the date and time of each event.

Additionally, most search engines and other computer-implemented search mechanisms offer text and other information about an event but do not present audio and visual previews of such events. Moreover, a user may be unable to easily share these events with other users. Consequently, a user may be unable to easily determine the events occurring in a geographic area and during a specific timeframe that are of interest to the user.

SUMMARY OF THE INVENTION

Various embodiments of systems and methods for generating an event map are provided herein. In some embodiments, a computer-implemented method for providing an event map is provided. The method includes receiving, by one or more processors, a request for an event map from a client computer associated with a user and obtaining, by one or more processors, a location and a time associated with the request. Additionally, the method includes identifying, by one or more processors, a plurality of events occurring within a distance threshold of the location and within a timeframe of the time, each of the plurality of events having an event location and an event time and creating, by one or more processors, an event map displaying event data for each of the plurality of events as a function of at least the distance of each event from the location. Further, the method also includes transmitting, by one or more processors, the event map to the client computer.

Additionally, in some embodiments a system for providing an event map is provided. The system includes one or more processors and a non-transitory tangible memory accessible by the one or more processors and having executable computer code stored thereon. The computer code includes a set of instructions that causes one or more processors to perform the following: receiving, by one or more processors, a request for an event map from a client computer associated with a user and obtaining, by one or more processors, a location and a time associated with the request. Additionally, the computer code further includes a set of instructions that causes one or more processors to perform the following: identifying, by one or more processors, a plurality of events occurring within a distance threshold of the location and within a timeframe of time, each of the plurality of events having an event location and an event time and creating, by one or more processors, an event map displaying event data for each of the plurality of events as a function of at least the distance of each event from the location. Further, the computer code includes a set of instructions that causes one or more processors to perform the following: also includes transmitting, by one or more processors, the event map to the client computer.

Figure 1:
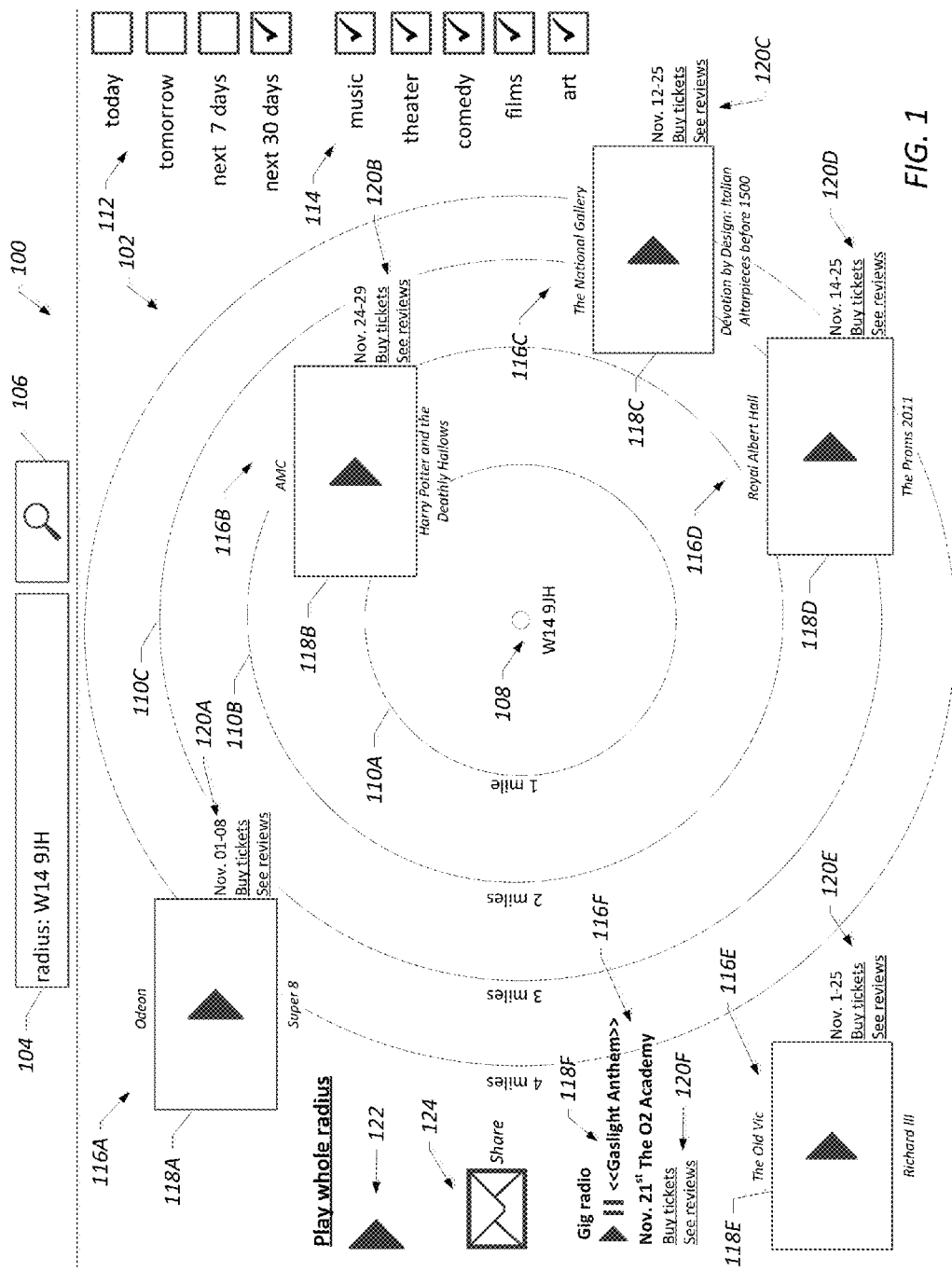
FIG. 1 is a schematic diagram of an event map in accordance with one or more embodiments of the present technique.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

As discussed in more detail below, provided in some embodiments are systems and methods for determining a location-based event map of events of interest to a user. In some embodiments, the event map (referred to as a "radius") may include embedded media, such as audio, video, images and the like, for events located within a specified geographic area, such as a geographic radius around a user's location. In some embodiments, the event map may display a series of concentric rings each corresponding to a different radius around the user's location. Each event may be displayed at a position on the event map that corresponds to the location of the event, and the embedded media for the event may be displayed at an event's position. Additionally, the event map may include event data for each event, such as date and time of the event and links to event-related resources, at the position of the event. By selecting (e.g., clicking) the media, a user may view the media related to an event.

The event map may include events based on one or more of the user's location (e.g., as determined via GPS or as manually input by the user), a timeframe (e.g., the current day, the next day, one week, one month), or user preferences. In additional embodiments, the events may be based on one or more of a user's previous selections of events, a user's interest categories, or a third party associated with the user. In some embodiments, the events may be ranked and the top ranked event included on the event map. Additionally, in some embodiments, a composite video (also referred to as a "radius trailer") may be generated and a link to the composite video may be included in the event map. The composite video includes a composite of the media for the events included on the event map, such that each portion of the video corresponds to a different event. Further, the event map may include links to enable a user to share the composite video with other users. In some embodiments, the event map, the composite video, or both may include advertisements.

FIG. 1 is a schematic diagram 100 depicting an event map 102 in accordance with embodiments of the present invention. The event map 102 may be depicted in a browser or other application executing on a client computer, such as a standalone application that displays the event map 102. The event map 102 may displayed in a window of a browser or other application having a search field 104 and a search button 106. In some embodiments, to initiate the event map 102, a user may input text into the search field 104 and select the search button 106. As shown in FIG. 1, for example, a user may input text and the user's postal code (e.g., "radius: W14 9JH") into the search box 104 and select the search button 106 to initiate generation of the event map 102 for the location identified by the postal code W14 9JH.

As shown in FIG. 1, the event map 102 may include a location indicator 108 that identifies the location used for the determination of events, such as the location input by a user or a location determined from data obtained from a user's computer. The location indicator 108 may include text identifying the location, such as a city, state, postal code (e.g., "W14 9JH), and the like. The event map 102 may also include distance indicators 110 that indicate distances from the location identified by the location indicator 108. For example, as shown in FIG. 1, the distance indicators 110 may include concentric rings around the location indicator 108 such that each concentric ring corresponds to a distance from the location indicator 108. As shown in FIG. 1, a first distance indicator 110A may indicate a distance of 1 mile from the location (e.g., postal code "W14 9JH") identified by the location indicator 108. Similarly, rings 110B, 110C, and 110D each indicate distances of 2 miles, 3 miles, and 4 miles respectively, from the location identified by the location indicator 108. In other embodiments, other types of distance indicators and distances may be used.

The event map 102 may also display selectable parameters such as a timeframe of events, event categories, etc. As shown in FIG. 1, for example, the event map 102 may include timeframe parameters 112 to provide for selection of the timeframe of events included on the event map 102. The timeframe parameters 112 may be displayed as any suitable selectable indicator, such as checkboxes, radio buttons, etc., and may include any suitable durations of time, such as the current day, the next day, the next several days, one week, multiple weeks, one month, multiple months, one year, and so on. For example, the embodiment depicted in FIG. 1 depicts timeframe parameters 112 as checkboxes providing for selection of a time frame of "today," "tomorrow," "next 7 days," and "next 30 days." As also shown in FIG. 1, the event map 102 may also include selectable event categories 114 to provide for selection of the types of events to display on the event map 102. The event categories 114 may be displayed as any suitable selectable indicator, such as checkboxes, radio buttons, etc., and may include multiple event categories corresponding to possible events occurring in a geographic area, such as film events, theater events such as plays, comedy events such as standup comedy shows, art events such as art exhibitions, music events such as concerts, etc. For example, the embodiment in FIG. 1 depicts selectable event categories 114 of "music," "theater," "comedy," "films," and "art."

The event map 102 may display multiple events 116 occurring near the location identified by the location indicator 108 and based on the selected timeframe parameters 112 and selected event categories 114 described above. In the embodiment depicted in FIG. 1, a user has selected a timeframe of "next 30 days" and selected all event categories of "music," "theater," "comedy," "films," and "art." The events may include, for example, movie events 116A and 116B, an art event 116C, a music event 116D, a theater event 116E, and another music event 116F. Each event may also include media 118 and event data 120 associated with the event. The media 118 can be provided as a link to an external source, or can be embedded in the event map 102. For example, the movie event 116A may include embedded video 118A and event data 120A, the movie event 116B may include embedded video 118B and event data 120B, the art event 116C may include embedded image slideshow 118C and event data 120C, and the music event 116D may include embedded video 118D and event data 120D associated with the event 118D. Additionally, the theater event 116E may include embedded video 118E and event data 120E associated with the event. Finally, music event 116F may include embedded audio 118F and event data 120F.

Each event 116 may be placed near the distance indicator 110 that corresponds to the location of the event 116 relative to the location identified by location indicator 108. For example, the movie event 116A may occur at a cinema approximately 1 mile from the user's location. Thus, the event 116A may be placed on the event map 102 near the distance indicator 110A that corresponds to a 1 mile distance from the location indicator 108. The movie event 116B may occur at a cinema approximately 4 miles from the user's location and is placed near the distance indicator 110D that corresponds to a 4 mile distance from the location indicator 108. Similarly, events 116C and 116D may occur at an art museum and a concert hall each located at approximately a 3 mile distance from the user's location. Accordingly the events 116C and 116D are placed near the distance indicator 110C that corresponds to a 3 mile distance from the location indicator 108. Finally, events 116E and 116F may occur at a distance greater than 4 miles from the user's location and are thus placed beyond the distance indicator 110D. In addition to being displayed at the appropriate distance from the location indicator 108, the events may be displayed at the appropriate location relative to the location indicator 108, i.e., at the appropriate distance and direction. Thus, an event that is due north of the location indicator 108 may be placed directly above the location indicator, while an event that is due south of the location indicator may be placed directly below.

As noted above, each event 116 may include event data 120, such as the name of the event, the time of the event, the name of the location hosting the event, and additional data. For each event, the event data 120 may be arranged to accommodate display of the embedded media 118 associated with the event. For example, the movie event 116A may include event data 120, such as the title of the movie (e.g., "Super 8") and the name of the location of the event ("Odeon"), respectively arranged above and below the embedded video 118A. Additionally, the movie event 116A may include additional event data, such as the date of the event (e.g., "Nov. 01-08") and links to tickets (e.g., "Buy tickets") and reviews (e.g., "See reviews"). Other types of events may include similar information. For example, the art event 116C may include event data 120C, such as the name of the exhibition ("Devotion by Design: Italian Altarpieces before 1500") and the location of the event (e.g., "The National Gallery"), respectively arranged above and below the embedded image slideshow 118C. The event 116C may also include additional event data, such as the date of the event (e.g., "Nov. 12-25") and links to tickets (e.g., "Buy tickets") and reviews (e.g., "See reviews"). Other events types may include different information about the event or display the information in different arrangements. For example, the music event 116F may event data 120F that includes the name of the performer of the event (e.g., "Gaslight Anthem") and the location of the event (e.g., "The O2 Academy"). The music event 116F may include additional event data such as the date of the event (e.g., "Nov. 21$^{st}$"), and links to tickets (e.g., "Buy tickets") and reviews (e.g., "See reviews"). This event data 120F may be arranged in a suitable manner to accommodate the display of the embedded audio 118F, such as by displaying the name and location below the embedded audio 118F.

As described above, the media 118 can include audio, video, image slideshows, or other suitable media or combinations thereof, associated with the events 116. To view the embedded media 118, a user may select (e.g., click) the media to play it. For example, to view a movie trailer for the movie event 116A (e.g., "Super 8") a user may click on the embedded video 118A. Similarly, to view an image slideshow of the art event 116C (e.g., "The National Gallery") a user may click on the embedded image slideshow 118C. In another example, a user may select (e.g., click) embedded audio 118F to play audio associated with the concert event (e.g., "Gaslight Anthem"). Any type of suitable media may be embedded in the event map 102 and provided for selection by a user. Alternatively, the media may be provided as a link to an external media source.

As also discussed above, a link 122 to a composite video of events (e.g., "Play whole radius") may be included on the event map 120. In addition to generation of the event map 102, the system may generate a composite video of the events displayed on the map. As described further below in FIG. 7, the composite video may include the media associated with the events displayed on the event map 102. For example, a composite video for the event map 102 may include the media 118A, 118B, 118C, 118D, 118E, and 118F consecutively arranged in the video. For media without audio, such as the image slideshow 118C, that portion of the composite video may include the image slideshow without audio. For audio media without video or images, such as the audio media 118F, the composite video may display a static image, such as an image associated with the event (e.g., an image of a band, location, album, etc.), during playback of the audio. The composite video may also include advertisements, such as audio advertisements, video advertisements, image advertisements, and the like that are relevant to the user, or to the locations or events depicted in the event map 102. To view the composite video, a user may select (e.g., click) the link 122. The composite video accessed by the link 122 may be played in the application displaying the event map 102, or selection of the link 122 may initiate a new application to play the composite video.

Figure 2:
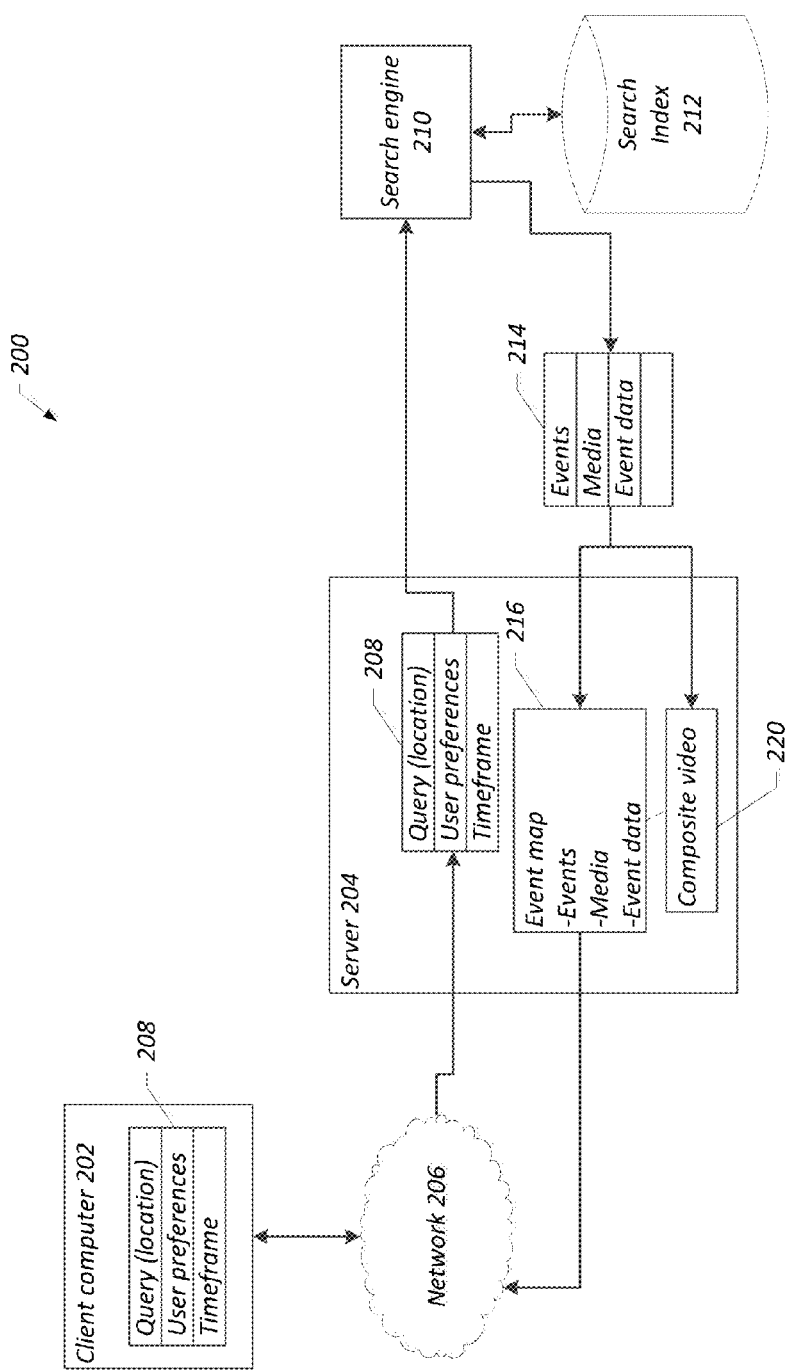
FIG. 2 is a block diagram of system in accordance with embodiments of the present invention.

Additionally, the event map 102 may include a "share" link 124 to enable a user to share the event map 102 with other users. Selection of the share link 124 may result in the creation of a message, such as email that contains a link to the event map 102. The recipients of the message may be automatically populated, manually entered by a user, or a combination thereof. In other embodiments, selection of the share link 130 may result in other types of communication, such as posting the link to the event map 102 on a microblogging service or a social networking service, instant messaging the link to the event map 102 to other users, or other types of communications. Additionally, or alternatively, selection of the share link 124 may enable a user to send the link 122 to the composite video to other users FIG. 2 depicts a system 200 illustrating generation of an event map and a composite video in accordance with embodiments of the present invention. As shown in FIG. 2, the system 200 may include a client computer 202 in communication with a server 204 (e.g., one or more servers) over a network 206, such that the client computer 202 may transmit data to and receive data from the server 204. In some embodiments, the client computer 202 may include thick-clients, thin-clients, or both. The client computer 202 may include, for example, smartphones, tablet computers, laptop computers, desktop computers, etc. In some embodiments, the system 200 may include multiple clients 202. The server 204 may include a single server (in a discrete hardware component or as a virtual server) or multiple servers. The server 204 may include web servers, application servers, or other types of servers. The servers 204 may be, for example, computers arranged in any physical and virtual configuration, such as computers in one or more data processing centers, a distributed computing environment, or other configuration. Such configurations may use the network 206 for communication or may communicate over other networks. The network 206 may include any suitable network, such as the Internet, an intranet, a local area network (LAN), a wide area network (WAN), or any other suitable network. The server 204 may include a geographic information system (GIS), a search engine, web services, or any combination of these systems. The servers may access data repositories such as databases. In some embodiments, the server 204 may include the data repositories, or the one or more of the data repositories may be stored on separate servers.

Initially, the client computer 202 may generate a request 208 for an event map. For example, as described above, a user of the client computer 202 may input a command to initiate generation of an event map. The request 208 may include request data used to generate an event map. For example, as shown in FIG. 2, the request may include the location of the user, event preferences, and a timeframe of events. In some embodiments, some or all of the request data may be obtained from the server 204 or from other servers. As noted above, the location of the user may be determined by the client computer, such as through satellite-based positioning (e.g., GPS), or may be manually input by the user. In other embodiments, the location of the user may be determined by the server 204, such as by IP address geolocation based on an IP address assigned to the client computer 202. After receiving a request for an event map from a user, the client computer 202 may transmit the request 208 to the servers 204.

The server 204 may receive and process the request 208. Upon receiving the request 208, the server 204 may obtain the data for the event map, such as the user's location, event preferences, timeframe of events, etc. Based on the request data, the server 204 may obtain events, event data, and media describing the events from a search engine 210 (e.g., one or more search engines) having a search index 212 (e.g., one or more indices). For example, the search engine 210 may include search engines capable of searching websites for media such as video, audio, images, etc related to events. Moreover, such search engines may search and index events and return results identifying events and having event data, such as names, locations, dates, and so on. For example, a search for movie events in a particular location may return a listing of movies, showtimes, and cinema locations. In some embodiments, the search engine 210 and search index 212 may be integral to server 204 or may exist independently of server 204.

The search engine 210 may return event results 214 based on the event data provided by the server 204. The event results 214 may be based on one search or multiple searches using a single search engine or multiple search engines. As shown in FIG. 2, the event results 214 may include identified events, event data, and links to media associated with the events, such as audio, video, images, etc. The server 204 may receive the event results 214 and generate an event map 216 based on event results 214. For example, based on the events identified in the event results 214, the server 204 may create the event map 216 by arranging some or all of the identified events on the event map based on the distance from the user's location. In some embodiments, generation of the event map 216 may include filtering and discarding events based on location, event preferences, and the timeframe of events. Additionally, as described above, the server 204 may include event data for each event and may embed media for each event based on the event data and media links included in the event results 214.

Additionally, the server 204 may generate a composite video 220 based on media associated with each event included in the event results 214. It should be appreciated that the generation of the composite video 220 and the generation of the event map 216 may occur on the same server or different servers. As described in detail below, the composite video 220 may include the media associated with each event arranged in a single video. Additionally, the event data for each event included in the event results 214 may be overlaid on the composite video 220. For example, for each event, the date and time of the event, the location of the event, and links to reviews, tickets, etc., may be overlaid on the corresponding portion for the event in the composite video. As noted above, the generated event map 216 may also include a link to the composite video 220. In some embodiments, the composite video 220 may be generated before or after generation of the event map 216 or concurrently with generation of the event map 216. Although generation of the event map is describes as being performed on the server 204, it should be appreciated that in some embodiments the event map may be generated on the client computer 202. For example, the client computer 202 may obtain the data needed to generate the event map and may generate the event map on the client computer 202, such by an application executing on the client computer 202.

After generation of the event map 216, the event map 216 may be transmitted over the network 206 to the client computer 202, such as for display on the client computer 202. For example, as noted above, the event map 216 may be displayed in a browser or other application executing on the client computer 202. After receiving the event map 216, a user of the client computer 202 may select a link for an event depicted on the event map 102, such as a link to view media associated with the event. These selections may be transmitted over the network 206 and processed by the server 204 or may be processed by other servers. Moreover, a user may make changes to the event map, such as by selecting alternative timeframes or event categories to be displayed on the event map. These selections may be transmitted to the server 204 and used to generate a modified event map.

Figure 3:
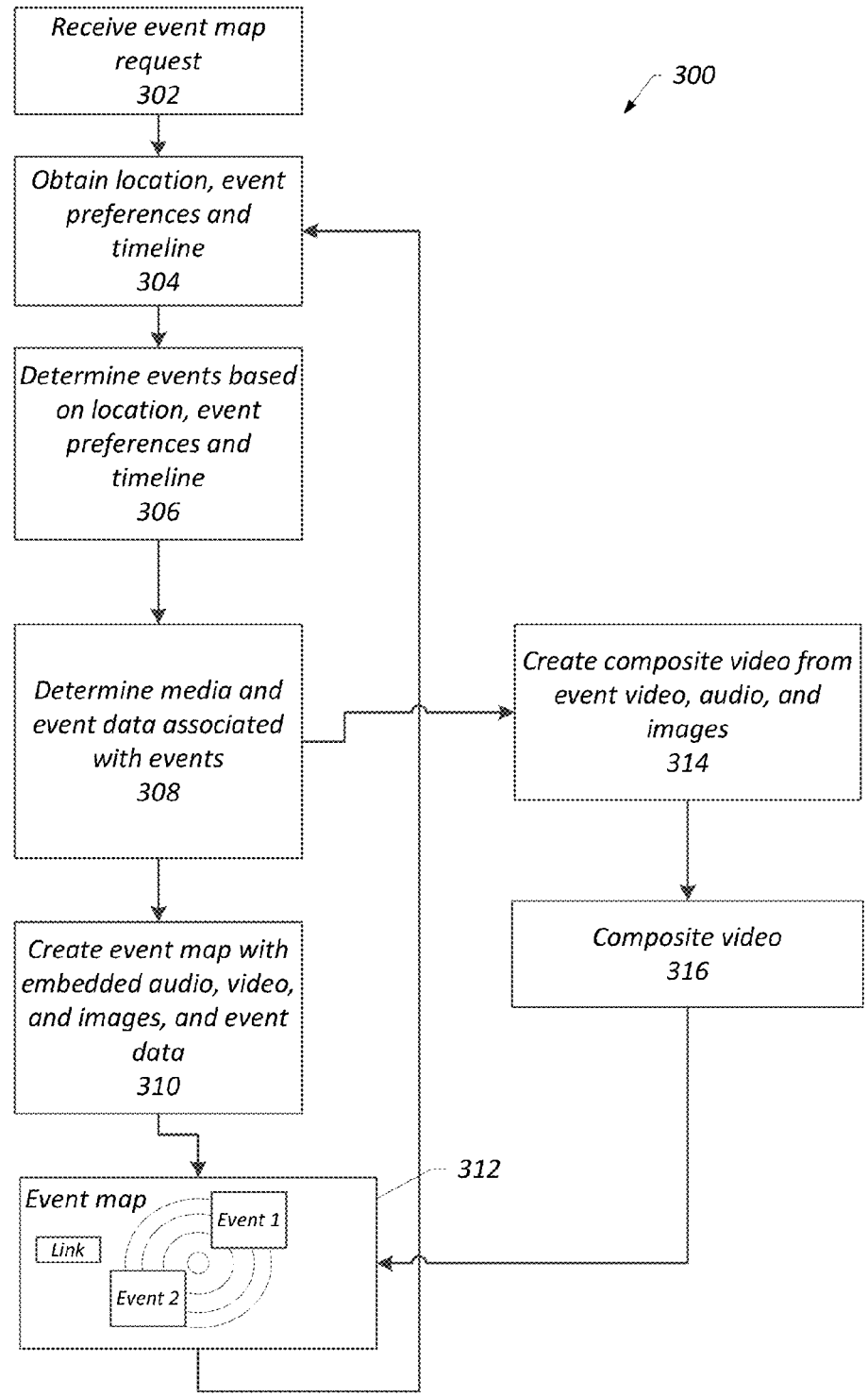
FIG. 3 is a block diagram of a process for generation of an event map in accordance with embodiments of the present invention.

FIG. 3 depicts a process 300 illustrating generation of an event map in accordance with embodiments of the present invention. Some or all steps of the process 300 may be implemented as executable code instructions stored on a non-transitory tangible machine readable medium and executed by a processor (e.g., one or more processors) of a computer (e.g., one or more computers). Initially, a request to generate an event map may be received (block 302). For example, a user may enter a query or other command, such as in a search field of a search webpage displayed in a browser executing on a client computer. Next, the user's location, event preferences, and timeline of events may be obtained (block 304). In some embodiments, the location, event preferences, and timeline may be transmitted with the event map request and received from a client computer. In other embodiments, the location, preferences, timeline, or any combination thereof may be determined independently from the event map request. For example, as noted above, the location may be determined by geolocation of the IP address assigned to a client computer. In another example, some or all event preferences may be retrieved from stored settings associated with the user, based on a unique identifier for the user or client computer (e.g., cookies).

Next, events based on the location, event preferences, and timeline may be determined (block 306). As described above, the events may be determined via search engines having search indexes, or via any other suitable technologies for sorting and searching data. In some embodiments, the determination may be restricted to the types of events specified by the event preferences or other restrictions. In other embodiments, event results may be obtained and those events not meeting the event preferences may be filtered and removed from the event results.

Next, the event data and media associated with the events may be obtained (block 308). For example, for each event, the event data such as name, date and time, location, links to ticketing websites, links to reviews, etc., may be obtained. In some embodiments, the event data may be obtained from a single source. For example, a search engine may return event results having both the events and event data for each event. Alternatively, or additionally, event data may be obtained from additional sources, such as additional searches, search engines, or both. For example, a search engine may return events and the date and time of the events, but additional event data such as links to tickets and reviews may be obtained from other sources, such as another search engine that indexes specific ticketing websites and review websites.

Additionally, media associated with each event may be determined. Here again, the media may be obtained from search engines having search indexes, such as search engines capable of searching different websites and services that provide media that may be related to events. For example, the media for events may be obtained from websites and services such as video-sharing websites and services, music websites and services, and image-sharing websites and services, etc. The determination may include identifying links to the media associated with each event to enable inclusion of this media in an event map.

Next, an event map may be generated from the events, event data, and identified media (block 310). As described above in FIG. 1, the generated event map 312 may include events, event data, and media spatially arranged relative to the location of the user or specified by the user. The media associated with each event may be embedded in the generated event map or provided as links to the source of the event media. For example, if an event is associated with a video on a video-sharing website, the event map may provide a link to the video-sharing website. In other embodiments, media may be cached on a separate server and links to the cached media may be provided in the event map 312. As noted above, other types of media, such as images (e.g., presented as image slideshows or as a single image) and audio may be linked to or embedded in the event map 312. In some embodiments, as described below, the events may be ranked and only the top ranked events included on the event map 312

In some embodiments, relevant advertisements are added to the event map 312 based on data associated with the events, the location, the user, or combinations of the same. For example, advertisements from a ticket vendor can be displayed to advertise sales of tickets to upcoming events occurring at different places or in different times. Advertisements from a limousine or ride-sharing service can be displayed to advertise transportation to and from the events depicted in the event map. In some embodiments, the advertisements are provided based on user location, event location, interest category data, user web-browsing history, third-party data, and other data associated with the events, the user, or the locations. The advertisements may be selectable, and may include image advertisements, video advertisements, textual advertisements, and other advertisements viewable on the event map 312. As will be appreciated, the advertisements may be sold (e.g., at an auction) to advertisers and priced using techniques known in the art. In addition to generating an event map based on the identified events, a composite video may be generated from the event media (block 314). As described in detail below, the composite video 316 may include sequentially arranged portions corresponding to the events included on the event map. For example, the composite video 316 may include a first video portion, a second video portion, an audio portion, an image slideshow, and the like. Additionally, as described further below, generation of the composite video 316 may include overlaying event data on the respective portion of each event in the composite video, as well as relevant advertisements. Moreover, as described above, generation of the event map 312 may include providing a link to the composite video 316 and a link to share the event map 312 with other users. Additionally, after generation of the event map, a user may make further selections of event preferences and timeline, such as by selecting different or additional checkboxes on the event map. Thus, after generation of the event map, additional locations, event preferences, and timelines may be obtained (block 304) and additional maps may be generated.

Figure 4:
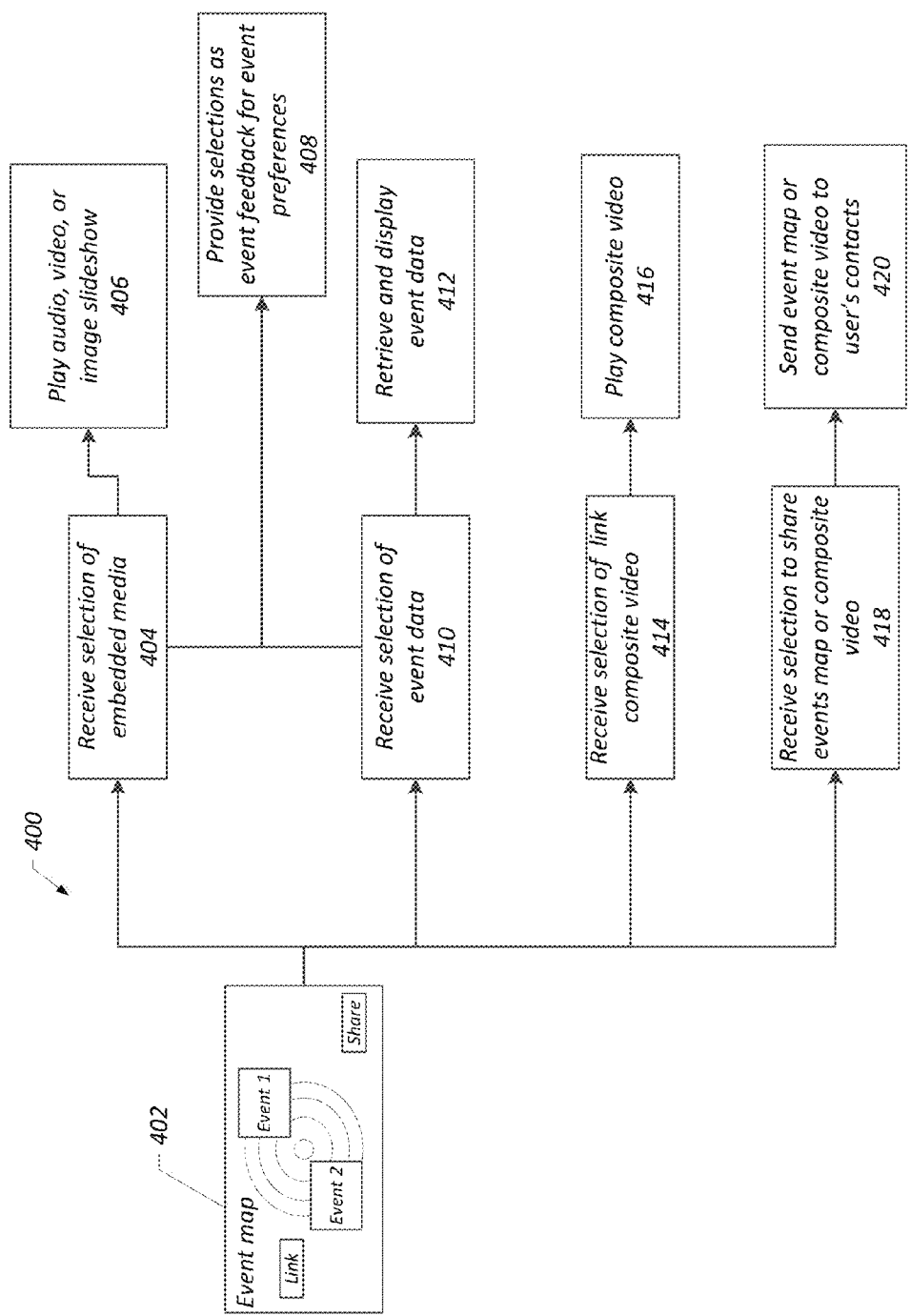
FIG. 4 is a block diagram illustrating interaction with an event map in accordance with embodiments of the present invention.

FIG. 4 depicts a process 400 illustrating interaction with an event map 402 in accordance with embodiments of the present invention. Some or all steps of the process 400 may be implemented as executable code instructions stored on a non-transitory tangible machine readable medium and executed by a processor (e.g., one or more processors) of a computer (e.g., one or more computers). As described above, the event map 402 may include events (e.g., "Event 1" and "Event 2") having media and event data spatially arranged on the event map 402 based on the event location relative to a user's location or specified location. Additionally, the event map 402 may include a link (e.g., "Link") to view a composite video and a share link (e.g., "Share") to share the composite video with other users.

Upon presentation of the event map 402, a user may perform a variety of actions. For example, a user's selection of embedded media may be received (block 404). A user may select (e.g., click on) a link to or an embedded video, audio, or image slideshow to view the video, audio, or image slideshow associated with an event. Upon receiving the user's selection, the media may be played to the user (block 406). In another action, a user's selection of links to event data may be received (block 410). For example, a user may select a link to reviews for an event or a link to purchase tickets for an event. After receiving the selection of the event data, the event data may be retrieved and displayed to the user (block 412), such as in a pop-up window. Based on the selection, the user may be directed to a website containing event reviews, or to a website selling tickets to the event. Additionally, in some embodiments, a user's selections may be stored and provided as feedback for event preferences, such as through an algorithmic learning mechanism. For example, if a user selects media for multiple events of a particular event category, such as chamber music concerts, that event category may be added to the event preferences for the user. In generating subsequent event maps, such preferences may be used to favor the display of events in the users preferred category.

Additionally, a user may also select the link to the composite video of events. The user's selection of the link to the composite video may be received (block 414) and the composite video may be played to the user (block 416). The composite video may be played in the same application used for viewing the event map or may be played in a separate application. Finally, a user may share the event map with other users by selecting the share link included on the event map 402. Accordingly, a user's selection of the share link may be received (block 418). Based on this selection, a link to the event map may be sent to others, such as to friends whose addresses are manually input by the user or to friends whose addresses are obtained from the user's social networking service, address book, etc.

As described, event map generation may include processing of event preferences. Event preferences may refer to any preferences for particular types of events to be included on an event map. Event preferences may include event categories, such as "music," "theater," "comedy," "films," and "art" specified above in FIG. 1. In some embodiments, event preferences may include more specific event preferences, such as sub-categories of the event categories. For example, for an event category of film, sub-categories may include action films, independent films, romantic comedy films, and so on. In another example, sub-categories for an event category of art may include modern art, classical art, abstract art, etc. In yet another example, sub-categories for an event category of music may include rock music, alternative music, independent music, classical music, and so on. Moreover, in some embodiments, event preferences may include specific preferences related to event data associated with events. For example, specific performers, artists, directors, days of the week, times, etc., may be included in the event preferences. Additionally, specific venues or locations, such as particular cinemas, museums, theaters, concert halls, and so on may be included in the event preferences.

Figure 5:
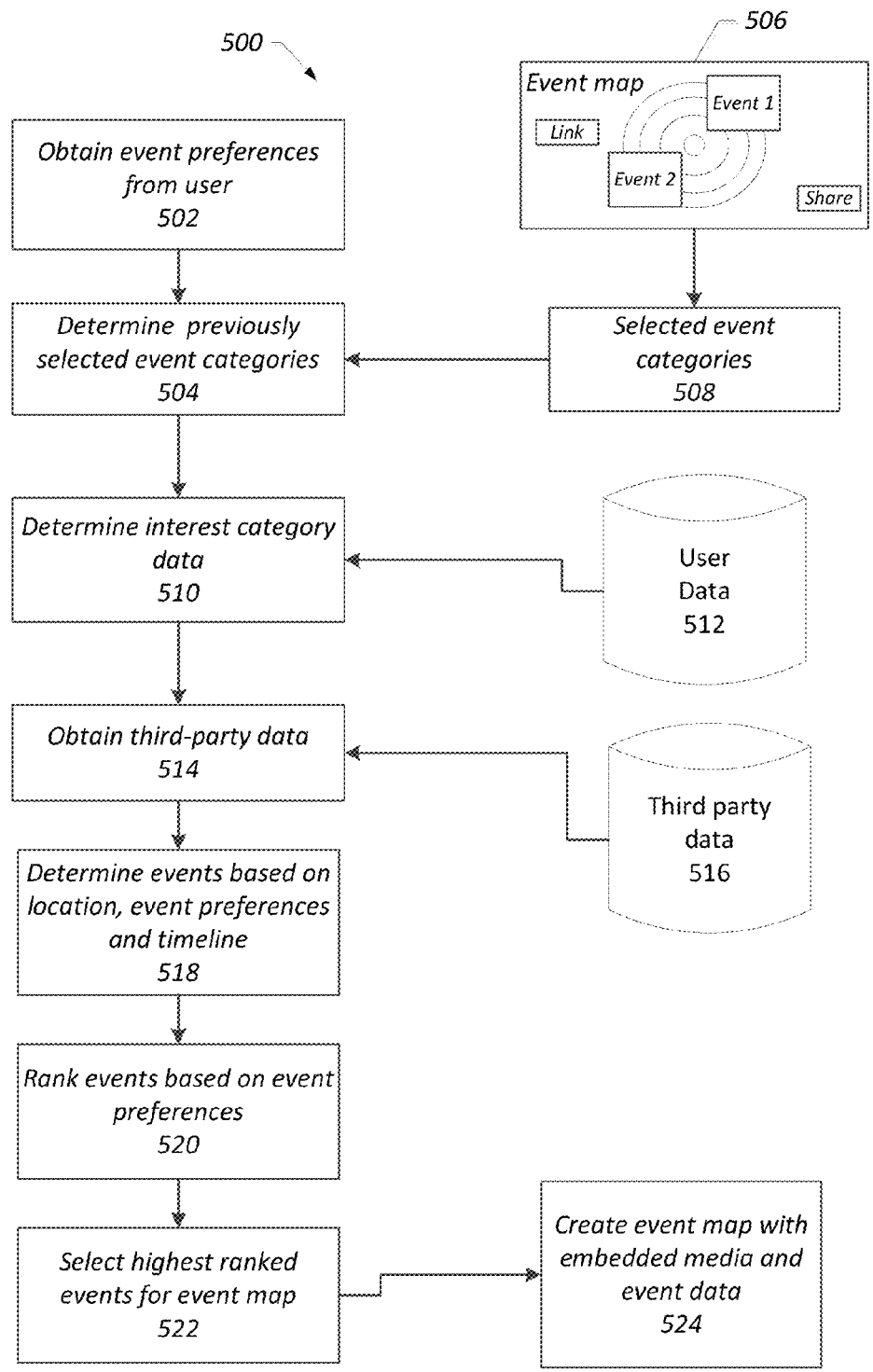
FIG. 5 is a block diagram of a process for the processing of event preferences during generation of an event map in accordance with embodiments of the present invention.

With the foregoing discussion in mind, FIG. 5 depicts a process 500 for processing event preferences during generation of an event map in accordance with an embodiment of the present invention. Some or all steps of the process 500 may be implemented as executable code instructions stored on a non-transitory tangible machine readable medium and executed by a processor (e.g., one or more processors) of a computer (e.g., one or more computers). As described above, a user may initiate the generation of the event map from a client, such as by entering a command in an application executing on the client. After the event map generation is initiated, event preferences may be obtained from a user (block 502). For example, as described above, in some embodiments, a request to generate an event map may include event preferences entered by a user and transmitted from the client. Additionally, as also described above, an event map may include selectable event categories enabling a user to select and refine event categories included on an event map. Next, a user's previously selected event categories (based on a user's previous selections) may be obtained (block 504). For example, a previously generated event map 506 presented to a user may provide previously selected event categories 508 of events. Some or all of the previously selected event categories 508 may be used as additional event preferences by the process 500.

Next, event preferences based on interest category data may be obtained (block 510). In some embodiments, user data 512 describing a user's interests may be accessible and may provide a source of interest category data for determination of additional event preferences. For example, a user's web-browsing habits, such as executed searches, selected search results, visited websites, and the like, may identify various interest categories associated with the user. Such interests may include, for example, locales, sports, hobbies, genres, etc. Event preferences based on these interest categories may be used as the basis for obtaining events for inclusion on a generated event map. For example, a user's previous searches and visited websites may associate a user with an interest category of "automobiles." Based on this interest category, an event preference of "racing films" (e.g., a sub-category of film events) may be determined for the user. In embodiments where user data is used to personalize the events selected for a user, the user may be required to agree to the collection, storage and use of the user's data. If the user elects not to have such information collected, stored and analyzed, such information will not be available to determine user preferences.

Next, in some embodiments, event preferences based on third-party data associated with the user may be determined (block 514). The third-party data may include data from third-party websites accessed by a user. For example, such websites may include e-commerce websites accessed by a user that enable purchases of goods and services. After accessing these websites, making purchases, etc., third-party data 516 may be stored and made available to other processes. Thus, the third-party data 516 may be accessed by the process 500, and the third-party data associated with a user may be obtained. Event preferences based on the third-party data may be used as the basis for determining events for inclusion on a generated event map. For example, if a user purchases artwork by a particular artist, an event preference for the artist, as named in the event data, may be determined for the user. As before, user permission may be required to obtain and use third party data, including permission for the third party to collect the user data, and permission for the third party to share the user data with the event map generating system.

Next, events may be determined based on a location, event preferences (as determined based on the steps described above), and a timeline of events (block 518). In some embodiments, a large number of events may be determined, such that the event map may be unable to include all events. Accordingly, in some embodiments, the determined events may be ranked based on various factors, including location, time, event preferences, or combinations of the above (block 520). The ranking may be a weighted ranking based on weights assigned to different event preferences, weights assigned to the date and time of the event relative to the current date and time, or weighting of other parameters. After ranking the events, the highest ranked events may be selected (block 522). The highest ranked events may then be used to generate an event map (block 524) having embedded media and event data associated with each event, as described above.

Figure 6:
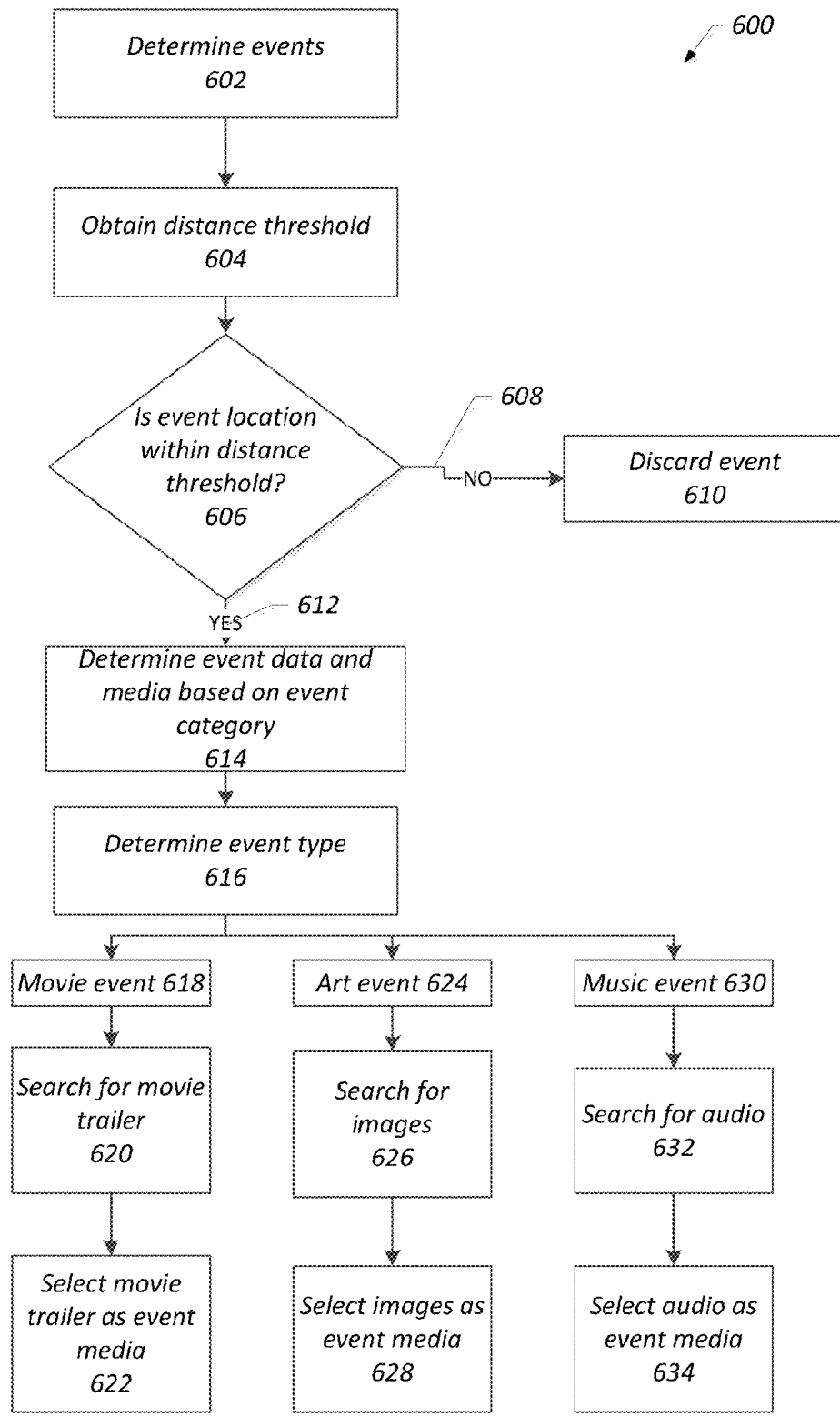
FIG. 6 is a block diagram of a process for the processing of events during generation of an event map in accordance with embodiments of the present invention.

As mentioned above, the generation of an event map may include determining the location of events relative to a specified location, such as a location manually input by a user or automatically determined from a client computer. FIG. 6 depicts a process 600 illustrating the processing of event locations for generation of an event map in accordance with embodiments of the present invention. Some or all steps of the process 600 may be implemented as executable code instructions stored on a non-transitory tangible machine readable medium and executed by a processor (e.g., one or more processors) of a computer (e.g., one or more computers). Initially, as described above in FIGS. 3 and 5, events may be determined based on various criteria (block 602), such as event preferences and a timeframe of events.

Next a distance threshold may be obtained (block 604). The distance threshold may be constant for each generation of an event map, or in other embodiments, the distance threshold may be set for each user or set for each generation of an event map. Moreover, in some embodiments, a user may input a distance threshold for use in generation of the event map. The distance threshold may be, for example, 1 mile, 2 miles, 3 miles, 4 miles, 5 miles, 6 miles, 7 miles, 8 miles, 9 miles, 10 miles, or greater than 10 miles. After obtaining the distance threshold, each determined event may be evaluated to determine if the location of the event is within (e.g., equal to or less than) the distance threshold (decision block 606). This determination may be based on any location associated with an event, such as an address, a zip code, or any other suitable location.

If the location of an event is not within the distance threshold (line 608), the event may be discarded (block 610) and not included on the event map. If the location of an event is within the distance threshold (line 612), event data and media for the event may be determined (block 614). In some embodiments, the determination of media for an event may be based on the type of event (e.g., the category of event). As described above, events may include different types of events, such as film events, art events, music events, theater events, and other types of events. The type of event may be determined (block 616) based identifying data, such as the event data associated with an event. Although FIG. 6 illustrates three types of events, other types of events may be processed in a similar manner. As shown in FIG. 6, event data and media may be retrieved for a movie event 618. In such an embodiment, a movie trailer for the movie event 618 may be searched for on a video-sharing service (block 620). Based on the search results, a movie trailer associated with the movie event 618 may be associated with the event as the event media (block 622).

Similarly, in another example, event data and media may be retrieved for an art event 624. For this type of event, pictures of the art event may be searched for (block 626), such by searching an image-sharing service. Based on the search results, images associated with the art event 624 may be associated with the event as the event media (block 628). In yet another example, event data and media may be retrieved for a music event 630. For a music event, audio of the artist performing the concert may be searched for (block 632), such as by searching a music service for songs performed by the artist. Based on the search results, audio associated with the artist performing the concert event 626 may be associated with the event as the event media (block 634).

Figure 7:
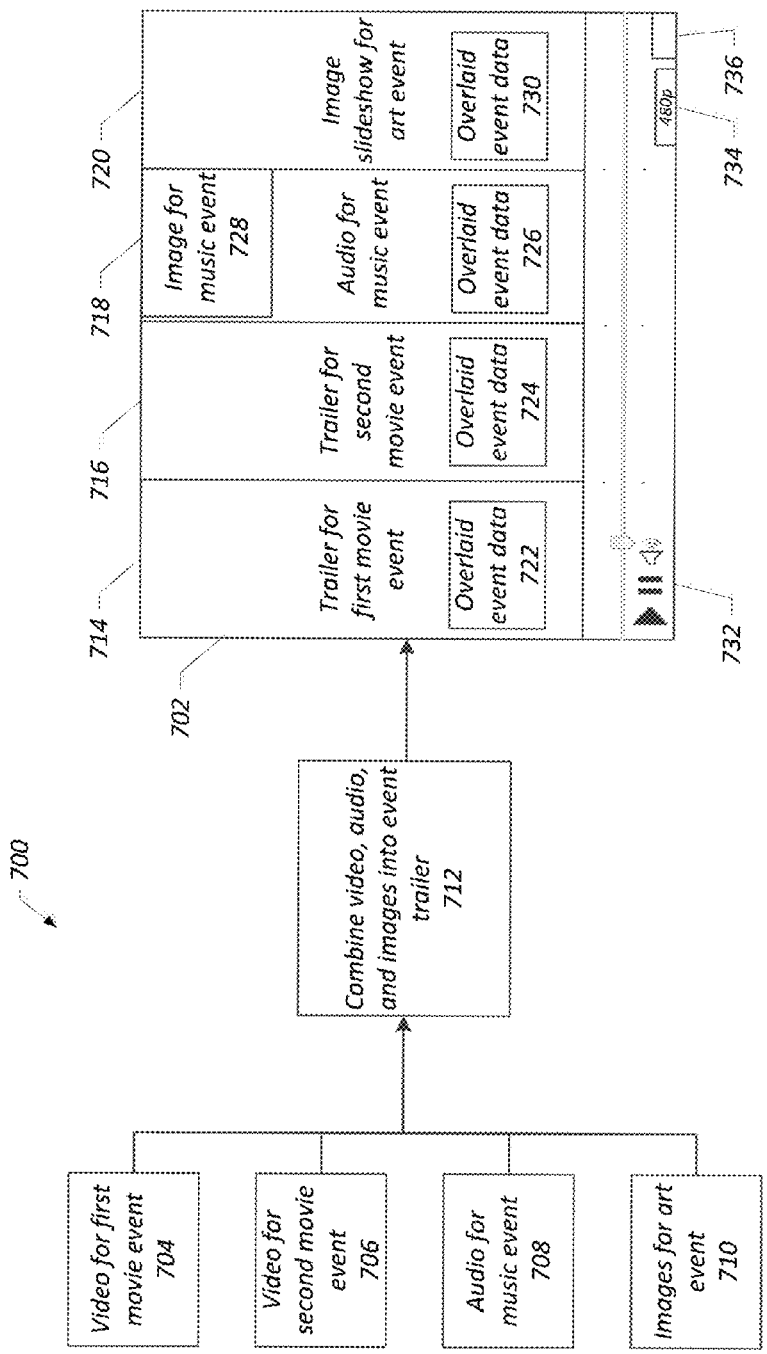
FIG. 7 is a block diagram of a process for generating a composite video of events in accordance with embodiments of the present invention.

As described above, in some embodiments a composite video of events may also be generated and accessed from an event map. FIG. 7 depicts a process 700 for generation of a composite video 702 in accordance with embodiments of the present invention. Some or all steps of the process 700 may be implemented as executable code instructions stored on a non-transitory tangible machine readable medium and executed by a processor (e.g., one or more processors) of a computer (e.g., one or more computers). Initially, media for multiple events may be obtained, as described above in FIGS. 3 and 6. As shown in FIG. 7, such media may include video 704 (e.g., a movie trailer) associated with a first movie event, video 706 (e.g., a movie trailer) associated with a second video event, audio 708 (e.g., a song) associated with a music event, and images 710 (e.g., pictures of artwork) associated with an art event.

Next, the media 704, 706, 708, and 710 for the events may be combined into the composite video 702 (block 712). For video media, each video may be included in the composite video without modifications or additions. Other types of media may include modifications or additions to be adapted for inclusion in the composite video. For audio media, the audio may be played as an audio track for a portion of the composite video. In some embodiments, for audio media without video or images, an image associated with the audio may be included in composite video and may be displayed during playback of the audio, as described below. For image media, images may be displayed as an image slideshow in a portion of the composite video. In some embodiments, for image media without any video or audio, audio associated with the images may be obtained and displayed during playback of the images.

The composite video 702 of events depicted in FIG. 7 illustrates the structure of the generated composite video. The composite video may include a first portion 714 corresponding to the video 704 associated with the first movie event, a second potion 718 corresponding to the video 706 associated with the second movie event, a third portion 722 corresponding to the audio media 708 associated with the music event, and a fourth portion 724 corresponding to the image media 710 associated with the art event. Each portion of the composite video 702 may be arranged sequentially, such that playback of the composite plays each portion in the order visualized in FIG. 7. Any number of events and media may be included in the composite video.

Additionally, event data for an event may be overlaid on the respective portion of the composite video 702. The event data may be overlaid as text, images, or both on the appropriate portion of the composite video. For example, such event data may be overlaid as "annotations" or other similar features of various types of videos. As shown in FIG. 7, the first portion 714 may include overlaid event data 722 (e.g., location, date, time, links to tickets, links to reviews) that provides information about the first movie event. Similarly, the second portion 716 may include overlaid event data 724 that provides information about the second movie event.

Additionally, as described above, some media included in the composite video 702 may include modified or additional content. As shown in FIG. 7, the third portion 718 of the composite video 702 may include overlaid event data 726 that provides information about the music event. Moreover, in addition to including the audio media associated with the music event, the third portion 718 may include an image associated with the music event. In some embodiments, during generation of the composite video 702, an image 728 (e.g., a picture of the music performer, an image of an album cover, or a picture of the venue etc.) associated with the music event may be obtained, such as in a similar manner as other image media. The image 728 may be displayed concurrently with the audio associated with the music event during playback of the third portion 718 of the composite video 702. Finally, the fourth portion 720 of the composite video 702 may include overlaid event data 726 associated with the art event. Here again, the event data may be displayed concurrently with the image slideshow during playback of the fourth portion 702 of the composite video.

In some embodiments, the composite video 702 may include advertisements. The advertisements may be based on user location, event location, interest category data, user web-browsing history, third-party data, and other data associated with the events, the user, or both. The advertisements may be overlaid on a portion of the composite video 702 corresponding to an event. For example, an image advertisement may be overlaid on a portion of the composite video. In some embodiments a "pre-roll" advertisement may be added to the composite video 702. In such embodiments, the pre-roll advertisement may be a video advertisement or other advertisement that plays before the first portion of the composite video 702. In some embodiments, a video, audio, graphical or textual advertisement can be placed at any location in the composite video 702, such as at the beginning, the end, or between any of the events depicted in the composite video. As will be appreciated, the advertisements may be sold (e.g., at an auction) to advertisers and priced as known in the art.

When the composite video link of the event map is selected by a user, the composite video 702 may be played back in an application of the client computer. The playback may include various software controls and indicators. For example, selectable video controls 732, such as play button, a pause button, and volume button, may be displayed to the user. Additionally, a selectable resolution indicator 734 may be displayed to the user to provide an indication of the current video resolution and enable selection of other resolutions. Finally, a selectable fullscreen button 736 may displayed to the user to enable toggling between a fullscreen display and a windowed display of the composite video.

Figure 8:
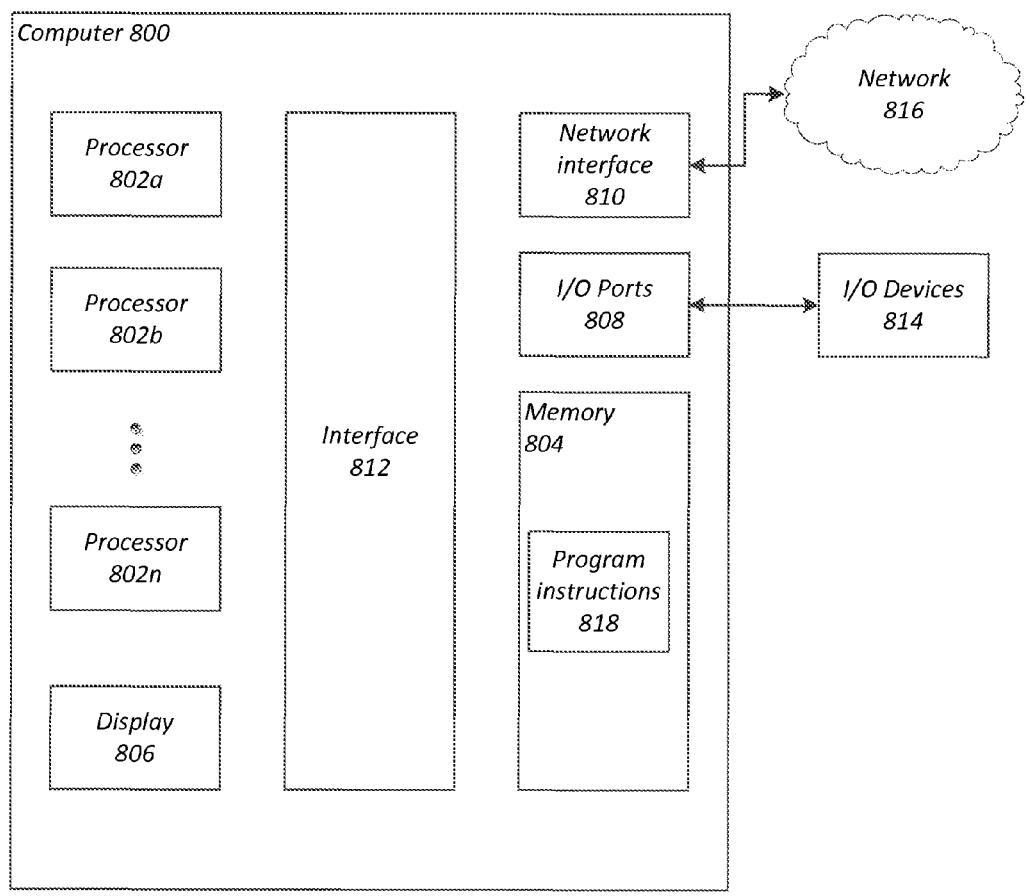
FIG. 8 is a block diagram of a computer in accordance with an embodiment of the present invention.

FIG. 8 depicts a computer 800 in accordance with an embodiment of the present invention. Various portions or sections of systems and methods described herein include or are executed on one or more computers similar to computer 800 and programmed as special-purpose machines executing some or all steps of processes described above as executable computer code. Further, processes, modules, and other components described herein may be executed by one or more processing systems similar to that of computer 800.

The computer 800 may include various components that contribute to the function of the device and enable the computer 800 to function in accordance with the techniques discussed herein. As will be appreciated, some components of computer 800 may be provided as internal or integral components of the computer 800 and some components may be provided as external or connectable components. Moreover, FIG. 8 depicts one example of a particular implementation and is intended to illustrate the types of components and functions that may be present in various embodiments of the computer 800.

Computer 800 may include a combination of devices or software that may perform or otherwise provide for the performance of the techniques described herein. For example, computer 800 may include or be a combination of a cloud-computing system, a data center, a server rack or other server enclosure, a server, a virtual server, a desktop computer, a laptop computer, a tablet computer, a mobile telephone, a personal digital assistant (PDA), a media player, a game console, a vehicle-mounted computer, or the like. The computer 800 may be a unified device providing any one of or a combination of the functionality of a media player, a cellular phone, a personal data organizer, a game console, and so forth. Computer 800 may be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available. As shown in the embodiment illustrated in FIG. 8, the computer 800 may include one or more processors (e.g., processors 802a-802n), a memory 804, a display 806, I/O ports 808 a network interface 810, and an interface 812. Additionally, the computer 800 may include or be coupled to I/O devices 814.

In addition, the computer 800 may allow a user to connect to and communicate through a network 816 (e.g., the Internet, a local area network, a wide area network, etc.) and, in some embodiments, to acquire data from a satellite-based positioning system (e.g., GPS). For example, the computer 800 may allow a user to communicate using e-mail, text messaging, instant messaging, or using other forms of electronic communication, and may allow a user to obtain the location of the device from a satellite-based positioning system.

In some embodiments, the display 806 may include a liquid crystal display (LCD) an organic light emitting diode (OLED) display, or other display types. The display 806 may display a user interface (e.g., a graphical user interface) executed by the processor 802 of the computer 800. The display 806 may also display various indicators to provide feedback to a user, such as power status, call status, memory status, network status etc. These indicators may be incorporated in the user interface displayed on the display 806. In some embodiments, the display 806 may include or be provided in conjunction with touch sensitive elements through which a user may interact with the user interface. In such embodiments, a touch-sensitive display may be referred to as a "touch screen" and may also be known as or called a touch-sensitive display system.

The processor 802 may provide the processing capability to execute the operating system, programs, user interface, and other functions of the computer 800. The processor 802 may include one or more processors and may include "general-purpose" microprocessors, special purpose microprocessors, such as application-specific integrated circuits (ASICs), or any combination thereof. In some embodiments, the processor 802 may include one or more reduced instruction set (RISC) processors, such as those implementing the Advanced RISC Machine (ARM) instruction set. Additionally, the processor 802 may include single-core processors and multicore processors and may include graphics processors, video processors, and related chip sets. Accordingly, the computer 800 may be a uni-processor system having one processor (e.g., processor 802a), or a multi-processor system having two or more suitable processors (e.g., 802a-802n). Multiple processors may be employed to provide for parallel or sequential execution of the techniques described herein. Processes, such as logic flows, described herein may be performed by the processor 802 executing one or more computer programs to perform functions by operating on input data and generating corresponding output. The processor 802 may receive instructions and data from a memory (e.g., system memory 804).

The memory 804 (which may include one or more tangible non-transitory computer readable storage mediums) may include volatile memory and non-volatile memory accessible by the processor 802 and other components of the computer 800. The memory 804 may store a variety of information and may be used for a variety of purposes. For example, the memory 804 may store executable computer code, such as the firmware for the computer 800, an operating system for the computer 800, and any other programs or other executable code for providing functions of the computer 800. Such executable computer code may include program instructions 818 executable by a processor (e.g., one or more of processors 802a-802n) to implement one or more embodiments of the present invention. Program instructions 818 may include modules of computer program instructions for implementing one or more techniques described herein. Program instructions 818 may include a computer program (which in certain forms is known as a program, software, software application, script, or code). A computer program may be written in a programming language, including compiled or interpreted languages, or declarative or procedural languages. A computer program may include a unit suitable for use in a computing environment, including a stand-alone program, a module, a component, a subroutine, and the like. A computer program may or may not correspond to a file in a file system. A computer program may be stored in a section of a file that holds other computer programs or data (e.g., one or more scripts stored in a markup language document), in a single file dedicated to the program in question, or in multiple coordinated files (e.g., files that store one or more modules, sub programs, or sections of code). A computer program may be deployed to be executed on one or more processors located locally at one site or distributed across multiple remote sites and interconnected by a communication network. Additionally, the memory 804 may be used for buffering or caching during operation of the computer 800.

As mentioned above, the memory 804 may include volatile memory, such as random access memory (RAM). The memory 804 may also include non-volatile memory, such as ROM, flash memory, a hard drive, other suitable optical, magnetic, or solid-state storage mediums or any combination thereof. The memory 804 may store data files such as media (e.g., music and video files), software (e.g., for implementing functions on computer 800), user preference information, payment transaction information, wireless connection information, contact information (e.g., an address book), and any other suitable data.

The interface 812 may include multiple interfaces and may enable communication between various components of the computer 800, the processor 802, and the memory 804. In some embodiments, the interface 812, the processor 802, memory 804, and one or more other components of the computer 800 may be implemented on a single chip, such as a system-on-a-chip (SOC). In other embodiments, these components, their functionalities, or both may be implemented on separate chips. The interface 812 may coordinate I/O traffic between processors 802a-802n, the memory 804, the network interface 810, 814, or any other devices or a combination thereof. The interface 812 may perform protocol, timing or other data transformations to convert data signals from one component (e.g., the memory 804) into a format suitable for use by another component (e.g., processors 802a-802n). The interface 812 may implement various types of interfaces, such as Peripheral Component Interconnect (PCI) interfaces, the Universal Serial Bus (USB) interfaces, Thunderbolt interfaces, Firewire (IEEE-1394) interfaces, and so on.

The computer 800 may also include an input and output port 808 to enable connection of additional devices, such as I/O devices 814. Embodiments of the present invention may include any number of input and output ports 808, including headphone and headset jacks, universal serial bus (USB) ports, Firewire (IEEE-1394) ports, Thunderbolt ports, and AC and DC power connectors. Further, the computer 800 may use the input and output ports to connect to and send or receive data with any other device, such as other portable computers, personal computers, printers, etc.

The computer 800 depicted in FIG. 8 also includes a network interface 810. The network interface 810 may include a wired network interface card (NIC), a wireless (e.g., radio frequency) network interface card, or combination thereof. The network interface 810 may include known circuitry for receiving and sending signals to and from communications networks, such as an antenna system, an RF transceiver, an amplifier, a tuner, an oscillator, a digital signal processor, a modem, a subscriber identity module (SIM) card, memory, and so forth. The network interface 810 may communicate with networks (e.g., network 816), such as the Internet, an intranet, a cellular telephone network, a wide area network (WAN), a local area network (LAN), a metropolitan area network (MAN), or other devices by wired or wireless communication. The communication may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11 standards), voice over Internet Protocol (VoIP), Wi-MAX, an email protocol (e.g., Internet message access protocol (IMAP) or post office protocol (POP)), message-oriented protocols (e.g., extensible messaging and presence protocol (XMPP), Multimedia Messaging Service (MMS), Short Message Service (SMS), or any other suitable communications standards, protocols, and technologies.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

In situations in which the processes and systems described herein collect information about users, or may make use of information, the users may be provided with an opportunity to control whether programs or features collect user information (e.g., information about a user's social network, social actions or activities, profession, a user's preferences, or a user's current location), or to control whether and how to receive content from a server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a server.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method for providing an event map, the method comprising:

receiving, by one or more processors, a request for an event map from a client computer associated with a user;

obtaining, by one or more processors, a location and a time associated with the request;

obtaining, by one or more processors, a selection of at least one event category;

identifying, by one or more processors, a plurality of events occurring within a distance threshold of the location, within a timeframe of the time and corresponding to the at least one event category, each of the plurality of events having an event location and an event time;

creating, by one or more processors, an event map displaying event data for each of the plurality of events as a function of at least the distance of each event from the location, including displaying on the event map (i) concentric rings indicating respective radii around the location, and (ii) event data for each event placed next to a concentric ring nearest to the location at which the event occurs;

generating a composite video from media associated with two or more of the plurality of events, the composite video comprising a consecutive arrangement of the media, including generating (i) a first portion using one of an embedded video, an embedded image slideshow, or an embedded audio corresponding to a first event, and (ii) a second portion using a different one of the embedded video, the embedded image slideshow, or the embedded audio corresponding to a second event, to generate the composite video with at least two different types of the media;

including the composite video in the event map as at least one of an embedded video or a link to the composite video; and transmitting, by one or more processors, the event map to the client computer.

2. The computer-implemented method of claim 1, wherein the first portion of the composite video is associated with a first one of the plurality events occurring at a first location and the second portion of the composite video is associated with a second one of the plurality events occurring at a second location.

3. The computer-implemented method of claim 1, wherein identifying media associated with events in the plurality of events comprises searching at least one of: a video website, a video service, an audio website, or an audio service for the media associated with the events.

4. The computer-implemented method of claim 1, wherein the plurality of events include at least one of: a movie event, a theater event, a concert event, or an art gallery event.

5. The computer-implemented method of claim 1, wherein obtaining the selection of the at least one event category includes obtaining a plurality of event preferences associated with the user.

6. The computer implemented method of claim 1, further comprising displaying the event data for each of the plurality of events in accordance with the direction of the event from the location.

7. The computer implemented method of claim 1, further comprising displaying a link on the event map for each of the plurality of events to allow a user to purchase tickets to the event.

8. The computer implemented method of claim 1, further comprising providing selectable category indicators.

9. The computer implemented method of claim 1, further comprising providing selectable time frame selectors.

10. The computer implemented method of claim 1, wherein the concentric rings correspond to fixed distance increments on the event map.

11. The method of claim 1, further comprising:
including the event map a link to share the composite vide with another user.

12. The method of claim 1, generating the composite video further includes generating a third portion including an advertisement.

13. The method of claim 1, wherein generating the composite video includes overlaying event data on the first portion of the composite video, the event data associated with the event to which the portion of the video corresponds.

14. The method of claim 13, wherein overlaying the event data on the first portion of the composite video includes a link to a ticket to the event.

15. A system for providing an event map, the system comprising:
one or more processors,
non-transitory tangible memory accessible by the one or more processors and having executable computer code stored thereon, the computer code comprising a set of instructions that causes one or more processors to perform the following:

receiving, by one or more processors, a request for an event map from a client computer associated with a user;

obtaining, by one or more processors, a location and a time associated with the request;

obtaining, by one or more processors, a selection of at least one event category;

identifying, by one or more processors, a plurality of events occurring within a distance threshold of the location, within a timeframe of the time and corresponding to the at least one event category, each of the plurality of events having an event location and an event time;

creating, by one or more processors, an event map displaying event data for each of the plurality of events as a function of at least the distance of each event from the location, including displaying on the event map (i) concentric rings indicating respective radii around the location, and (ii) event data for each event placed next to a concentric ring nearest to the location at which the event occurs, generating a composite video from media associated with two or more of the plurality of events, the composite video comprising a consecutive arrangement of the media, including generating (i) a first portion using one of an embedded video, an embedded image slideshow, or an embedded audio corresponding to a first event, and (ii) a second portion using a different one of the embedded video, the embedded image slideshow, or the embedded audio corresponding to a second event, to generate the composite video with at least two different types of the media;

including the composite video in the event map as at least one of an embedded video or a link to the composite video; and transmitting, by one or more processors, the event map to the client computer.

16. The system of claim 15, wherein the first portion of the composite video is associated with a first one of the plurality events occurring at a first location and the second portion of the composite video is associated with a second one of the plurality events occurring at a second location.

17. The system of claim 16, wherein generating the composite video further comprises overlaying event data associated with events with the media associated with events.

18. The system of claim 15, wherein identifying media associated with events in the plurality of events comprises searching at least one of: a video website, a video service, an audio website, or an audio service for the media associated with the events.

19. A method in a client computer for displaying an event map, the method comprising:

- obtaining, via a user interface by one or more processors, a selection of at least one event category;
- generating, by one or more processors, a request for an event map, wherein the request is associated with a location, a time, and the at least one event category;
- receiving, by one or more processors, an event map to depict a plurality of events corresponding to the event category, occurring within a distance threshold of the location and within a timeframe of the time, each of the plurality of events having an event location and an event time;
- display the event map depicting event data for each of the plurality of events as a function of at least the distance of each event from the location, including:
  - displaying concentric rings indicating respective radii corresponding to fixed distance increments around the location, and
  - displaying event data for each event next to a concentric ring nearest to the location at which the event occurs,
- including a composite video in the event map as at least one of an embedded video or a link to the composite video, wherein the composite video is generated from media associated with two or more of the plurality of events and comprises a consecutive arrangement of the media, the composite video including (i) one of an embedded video, an embedded image slideshow, or an embedded audio corresponding in a first portion to a first event, and (ii) a different one of the embedded video, the embedded image slideshow, or the embedded audio in a second portion corresponding to a second event.

* * * * *